United States Patent
Zhou et al.

(10) Patent No.: US 9,516,223 B2
(45) Date of Patent: Dec. 6, 2016

(54) MOTION-BASED IMAGE STITCHING

(75) Inventors: Jianping Zhou, Fremont, CA (US); Marco Zuliani, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 13/490,326

(22) Filed: Jun. 6, 2012

(65) Prior Publication Data

US 2013/0329072 A1 Dec. 12, 2013

(51) Int. Cl.
- H04N 5/225 (2006.01)
- H04N 5/232 (2006.01)
- G06T 3/40 (2006.01)

(52) U.S. Cl.
CPC ......... H04N 5/23238 (2013.01); G06T 3/4038 (2013.01); H04N 5/23258 (2013.01)

(58) Field of Classification Search
USPC .......................................... 348/218.1, 36–39
See application file for complete search history.

(56) References Cited

U.S. PATENT DOCUMENTS

| | | | |
|---|---|---|---|
| 6,044,181 A * | 3/2000 | Szeliski et al. | 382/284 |
| 6,389,179 B1 | 5/2002 | Katayama et al. | |
| 6,618,511 B1 | 9/2003 | Mancuso et al. | |
| 7,501,616 B2 | 3/2009 | Wiklof | |
| 8,064,719 B2 | 11/2011 | Ozluturk | |
| 8,064,720 B2 | 11/2011 | Ozluturk | |
| 8,154,607 B2 | 4/2012 | Ozluturk | |
| 8,295,547 B1 | 10/2012 | Cangiani | |
| 8,331,723 B2 | 12/2012 | Ozluturk | |
| 8,335,348 B2 | 12/2012 | Srikrishnan | |
| 8,335,400 B2 | 12/2012 | Kobayashi | |
| 8,345,102 B2 | 1/2013 | Huang | |
| 8,630,484 B2 | 1/2014 | Ozluturk | |
| 2003/0133020 A1 * | 7/2003 | Suh | 348/218.1 |
| 2006/0072176 A1 * | 4/2006 | Silverstein | G06T 3/005 358/540 |
| 2006/0088191 A1 | 4/2006 | Zhang | |

(Continued)

FOREIGN PATENT DOCUMENTS

| | | |
|---|---|---|
| EP | 0462905 | 12/1991 |
| TW | 201223271 A | 6/2012 |
| WO | 2012039307 | 3/2012 |

OTHER PUBLICATIONS

International Search Report and Written Opinion received in PCT Application No. PCT/US2013/041088, dated Aug. 6, 2013.

*Primary Examiner* — Sinh Tran
*Assistant Examiner* — Zhenzhen Wu
(74) *Attorney, Agent, or Firm* — Blank Rome LLP

(57) ABSTRACT

Systems, methods, and computer readable media for stitching or aligning multiple images (or portions of images) to generate a panoramic image are described. In general, techniques are disclosed for using motion data (captured at substantially the same time as image data) to align images rather than performing image analysis and/or registration operations. More particularly, motion data may be used to identify the rotational change between successive images. The identified rotational change, in turn, may be used to calculate a motion vector that describes the change in position between a point in a first image and a corresponding point in a subsequent image. The motion vector may be utilized to align successive images in an image sequence based on the motion data associated with the images.

28 Claims, 12 Drawing Sheets

(56) References Cited

U.S. PATENT DOCUMENTS

| | | |
|---|---|---|
| 2007/0081081 A1 | 4/2007 | Cheng |
| 2007/0285562 A1 | 12/2007 | Raynor |
| 2008/0089552 A1 | 4/2008 | Nakamura |
| 2009/0208062 A1 | 8/2009 | Sorek et al. |
| 2010/0017115 A1 | 1/2010 | Gautama |
| 2010/0020244 A1 | 1/2010 | Mitsuya |
| 2010/0194852 A1 | 8/2010 | Tseng et al. |
| 2011/0110605 A1* | 5/2011 | Cheong ............... 382/284 |
| 2011/0228112 A1* | 9/2011 | Kaheel ............ H04N 1/00127 348/208.4 |
| 2011/0304688 A1* | 12/2011 | Ge ............... 348/36 |
| 2011/0304694 A1* | 12/2011 | Nestares ............ H04N 5/23254 348/46 |
| 2011/0310255 A1* | 12/2011 | Medeiros et al. ............ 348/187 |
| 2012/0194687 A1 | 8/2012 | Ozluturk |
| 2012/0201427 A1 | 8/2012 | Jasinski |
| 2012/0218427 A1 | 8/2012 | Wu |
| 2012/0268554 A1* | 10/2012 | Gilbert-Schachter .. G03B 37/04 348/36 |
| 2012/0300019 A1* | 11/2012 | Yang et al. ............... 348/36 |
| 2013/0033568 A1* | 2/2013 | Kim et al. ............... 348/36 |
| 2013/0038743 A1 | 2/2013 | Ozluturk |
| 2014/0218470 A1* | 8/2014 | Rondinelli et al. ............ 348/36 |

\* cited by examiner

MOTION-BASED IMAGE STITCHING

BACKGROUND

This disclosure relates generally to the field of image processing. More particularly, but not by way of limitation, this disclosure relates to techniques for improving real-time panoramic photography processing using motion data (e.g., gyroscopic sensor input).

Panoramic photography may be defined generally as a photographic technique for capturing images with elongated fields of view. An image showing a field of view approximating, or greater than, that of the human eye, e.g., about 160° wide by 75° high, is usually termed "panoramic." Thus, panoramic images generally have an aspect ratio of at least 2:1, meaning that the image is at least twice as wide as it is high (or, conversely, twice as high as it is wide, in the case of vertical panoramic images). In some embodiments, panoramic images may even cover fields of view of up to 360 degrees, i.e., a "full rotation" panoramic image.

There are many challenges associated with taking visually appealing panoramic images. These challenges include photographic problems such as: difficulty in determining appropriate exposure settings caused by differences in lighting conditions across the panoramic scene; blurring across the seams of images caused by motion of objects within the panoramic scene; parallax problems (i.e., problems caused by the apparent displacement or difference in the apparent position of an object in the panoramic scene as the image capture device is panned); properly aligning the various images used to construct the overall panoramic image; blending between the overlapping regions of various images used to construct the overall panoramic image; choosing an image projection correction that does not distort photographically important parts of the panoramic photograph (e.g., rectangular, cylindrical, Mercator); and correcting for perspective changes between subsequently captured images.

Some prior art panoramic photography systems may utilize gyroscopic information to assist in image analysis and registration. As the number of images within a given time period that are aligned to generate a panoramic image increases, however, the computational costs of performing image analysis and registration can become prohibitive. This may be particularly true for image capture devices embedded in handheld electronic devices such as mobile phones, personal data assistants (PDAs), portable music players, digital cameras, as well as laptop and tablet computer systems.

SUMMARY

In one embodiment the invention provides a method to align or stitch together digital images without analyzing the image or performing standard image registration (both generally computationally expensive operations). The method includes obtaining a first image from an image capture device (e.g., a digital camera). At substantially the same time, motion information for the first image may be obtained (e.g., from a gyroscopic and/or accelerometer sensors). A second image having a focal length may then be obtained. As with the first image, motion data for the second image may be obtained at substantially the same time that the second image is obtained. A rotation metric between the two images (e.g., due to motion of the image capture device) based on sensor output data may be determined. A translation measure for the second image, relative to the first image, may be determined based on the rotation metric and the focal length. The second image may then be aligned with the first image using the translation measure. In one embodiment, the translation measure may include a first translation measure for a first axis and a second translation measure for a second axis. It is significant that the two images may be aligned without performing standard image processing or analysis.

The disclosed methods may be embodied in program code and stored on a non-transitory storage medium. The stored program code may be executed by a programmable control device that is part of, or controls, an image capture device.

DETAILED DESCRIPTION

This disclosure pertains to systems, methods, and computer readable media for stitching or aligning multiple images (or portions of images) to generate a panoramic image. In general, techniques are disclosed for using motion data (captured at substantially the same time as image data) to align images rather than performing standard image analysis and/or registration operations. More particularly, motion data derived from sensor output may be used to identify the rotational change between two images. The identified rotational change may be used to directly align/stitch the images.

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the image processing field having the benefit of this disclosure.

Figure 1:
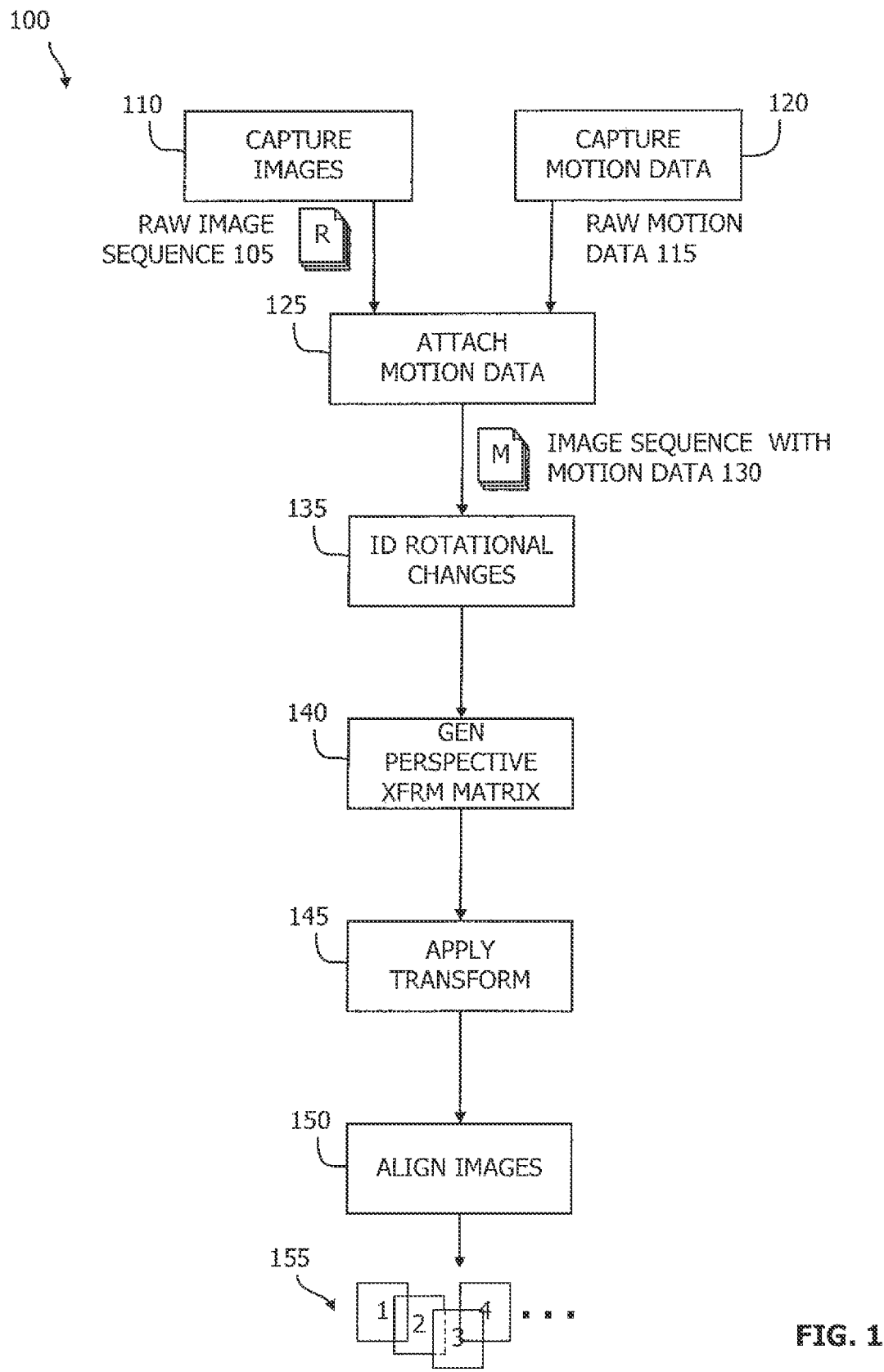
FIG. 1 shows, in flowchart form, an image stitching operation in accordance with one embodiment.

Referring to FIG. 1, image stitching operation 100 in accordance with one embodiment begins by capturing raw image sequence 105 (block 110) and corresponding motion data 115 (block 120). Motion data 115 may then be attached to individual images within raw image sequence 105 (block 125) to produce image sequence 130. It can be advantageous to capture motion data for each image in raw image sequence 105 so that each captured image has a corresponding motion datum. It can also be advantageous, and is common, for each image in an image sequence to have a timestamp indicating when the particular image was captured (e.g., during acts in accordance with block 110). The rotational change between successive images in image sequence 130 may be identified (block 135) and used to generate a perspective transform matrix (block 140). Applying the perspective transform to a "current" image (block 145) allows it to be aligned with a previously captured image (block 150) to produce aligned image sequence 155, a panoramic image.

Figure 2A:
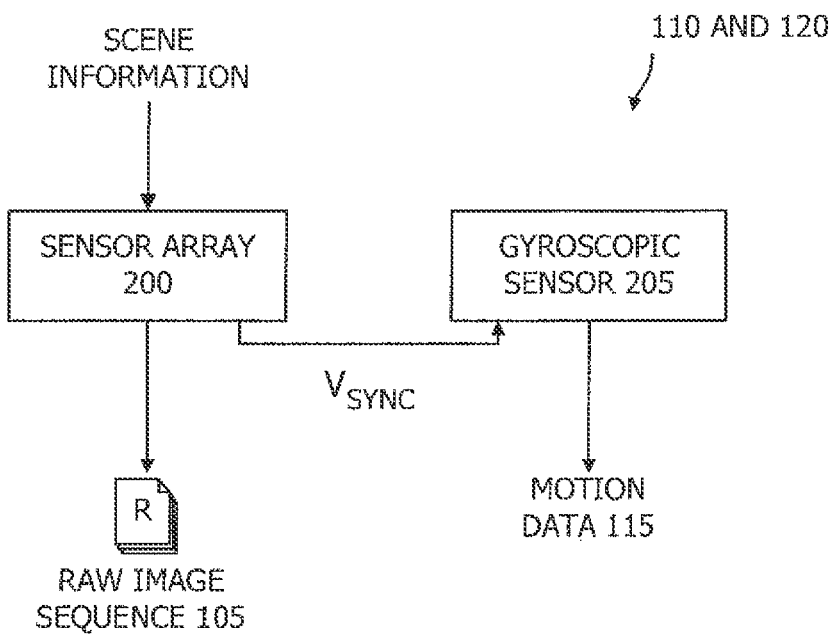
FIGS. 2A and 2B show, in block diagram form, two different embodiments for correlating image data with motion data.

Referring to FIG. 2A, in one embodiment image capture operation 110 may be preformed by sensor array 200 and motion data capture operation 120 may be performed by gyroscopic sensor (gyro) 205. Sensor array 200 may capture black and white or color images and use, for example, complementary metal-oxide semiconductor (CMOS) or charged-coupled device (CCD) technology. Gyro sensor 205 may be used to generate rotation rate data in three dimensions (e.g., (x, y, z) or (pitch, roll, yaw) or in a quaternion system). Gyro sensor 205 may use any desired technology such as micro-electromechanical systems (MEMS) technology.

Figure 2B:
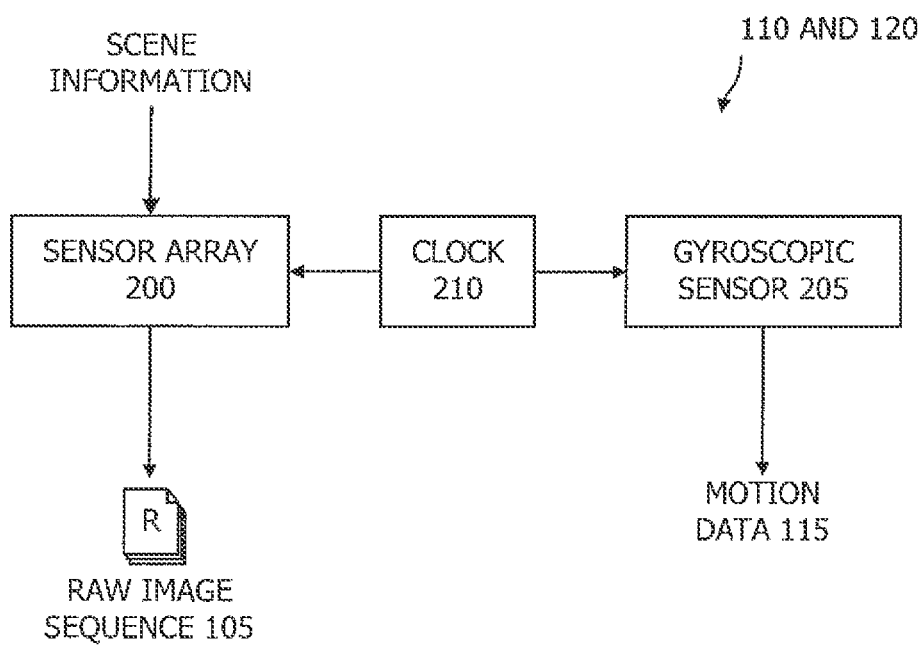

It will be understood that images captured in accordance with block 110 (e.g., by sensor array 200) and motion data captured in accordance with block 120 (e.g., by gyro sensor 205) should be correlated. It is important that an image captured at time $t_0$ be synchronized with motion data captured at substantially the same time. In the embodiment illustrated in FIG. 2A, image sensor 200 may signal gyro sensor 205 each time an image is captured through, for example, the $V_{sync}$ signal. Gyro sensor 205, in turn, may tag each "next captured" motion datum each time a $V_{sync}$ signal is received. This permits each image in raw image sequence 105 to be correlated or associated with the proper motion data. Use of the phrase "next captured" reflects the possibility that motion sensor 205 may operate on a different clock signal than sensor array 200. That is, sensor array 200 and gyro 205 may operate asynchronously. Referring to FIG. 2B, in another embodiment common clock 210 may drive both image sensor array 200 and gyro 205. This arrangement permits the synchronous capture of image and motion data.

Figure 3:
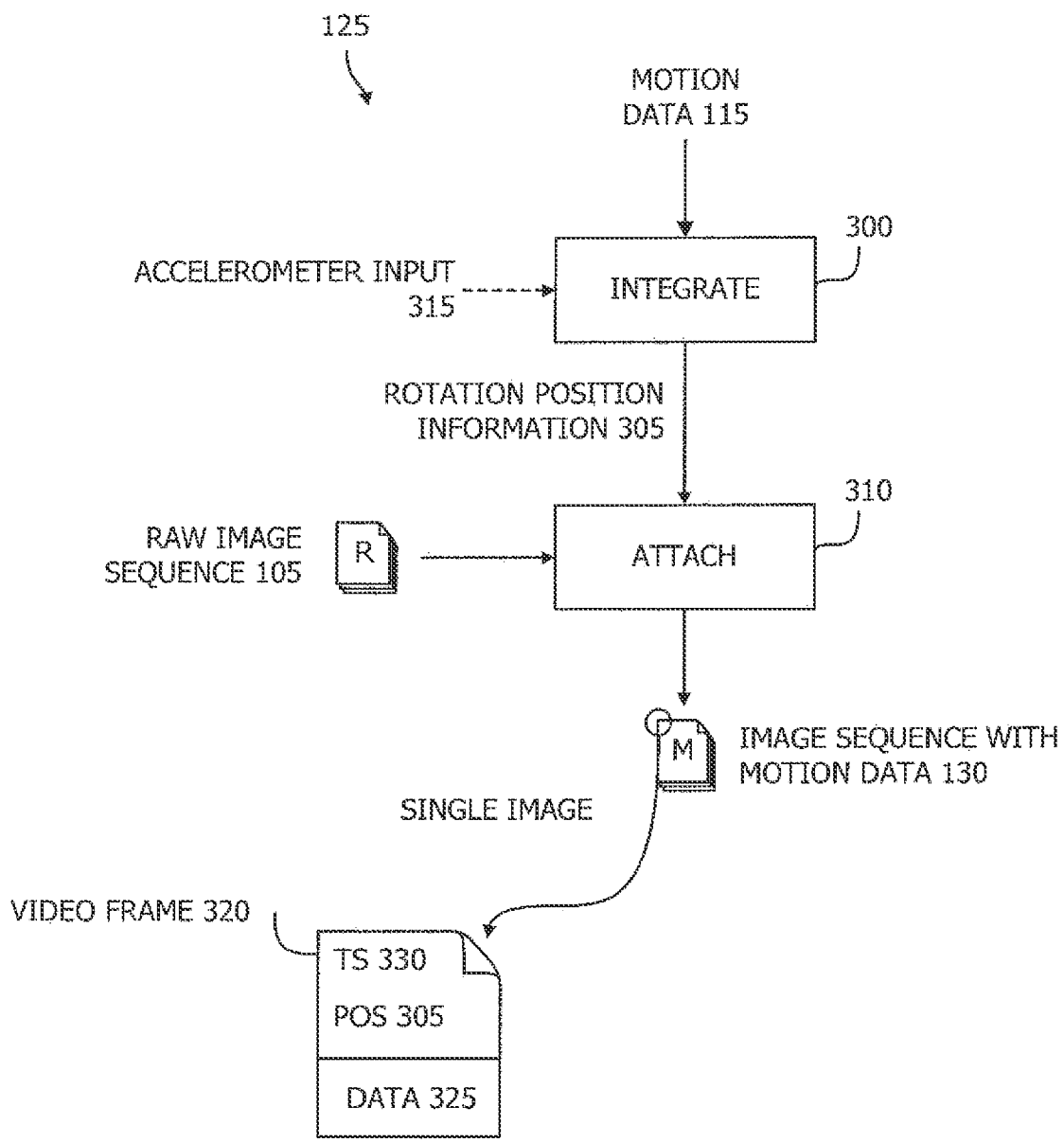
FIG. 3 shows, in flowchart form, motion data being processed and attached to image data in accordance with one embodiment.

Referring to FIG. 3, in one embodiment motion data 115 may be attached to image data (i.e., each image in raw image sequence 105) through process 125. First, it will be understood that when a gyro sensor such as sensor 205 is used to provide motion information 115, what is actually produced is rate information: the rate at which the image capture device is being moved in each of, for example, 3 axis. Rate information may be integrated (block 300) to produce instantaneous rotation position information 305 (also in each of 3 axis). Using image timestamp information each image in raw image sequence 105 may be associated with the appropriate rotation position information 305 (block 310). In another embodiment, operation 125 may also use accelerometer input 315 to assist in calibrating gyro sensor 205's output. Also shown in FIG. 3 is a high-level representation of a single image frame 320 from image sequence 130. As shown, image 320 includes data 325 representing the image itself and timestamp 330 provided during acts in accordance with block 110. After attach operation 310, image 320 may also include position information 305.

Figure 4A:
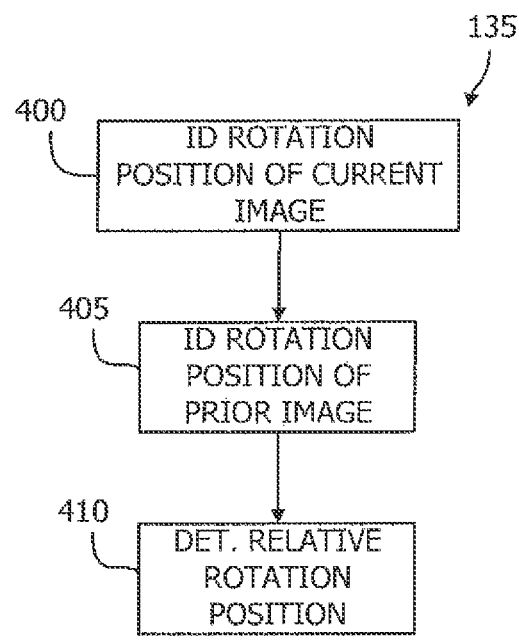
FIGS. 4A and 4B show how rotational information between two images may be determined in accordance with one embodiment.
Figure 4B:
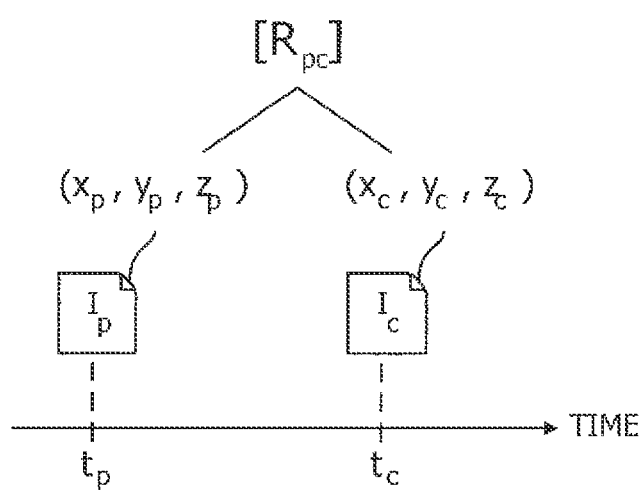

Referring to FIG. 4A, identifying the relative rotation between successive images 135 in accordance with one embodiment begins by identifying the rotation position of the current image (block 400) and the rotation position of a prior image (block 405) upon which rotation for the current image is to be based (e.g., the immediately prior frame). As described above, this information may be attached to each image in accordance with block 125 (see also, FIG. 3). These two positions may be used to determine the rotation of the current image relative to the prior image. This operation may then be repeated for the next image in image sequence 130 and so on. Referring to FIG. 4B, two images from image sequence 130 are shown. Prior image $I_p$ was captured at time $t_p$ and has rotation position information $x_p$, $y_p$, and $z_p$. Current image $I_c$ was taken at time $t_c$ and has rotation position information $x_c$, $y_c$, and $z_c$. The difference between the rotation position of image $I_p$ and image $I_c$ represents the amount of rotation experienced by the image capture unit between time $t_p$ and $t_c$ and can be represented by a 3×3 rotation matrix denoted $[R_{pc}]$ and associated with image $I_c$. It will be recognized that the use of Cartesian coordinates is merely illustrative, any coordinate system may be used. It will also be recognized by those of skill in the art that rotation matrix $[R_{pc}]$ may be generated in accordance with any of a number of techniques but is not, in general, the algebraic difference between the rotation position of image $I_p$ and image $I_c$.

Figure 5:
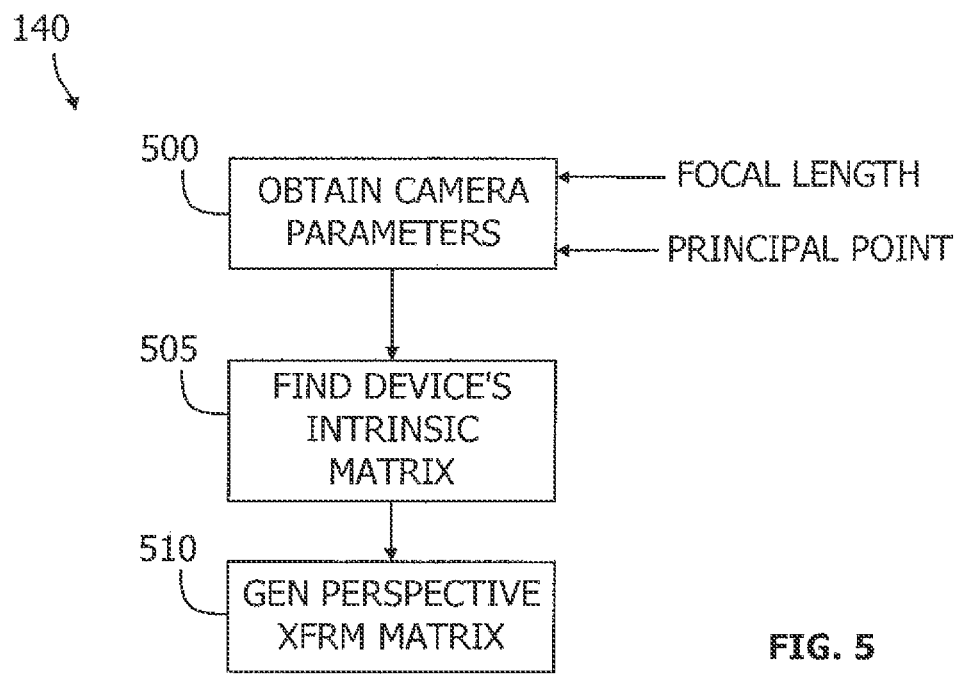
FIG. 5 shows, in flowchart form, a perspective transform matrix generation operation in accordance with one embodiment.

Referring to FIG. 5, a perspective transform for each image in image sequence 130 in accordance with block 140 obtains various parameter values from the image capture device (block 500). Illustrative parameters include the focal length used to capture an image and the image capture device's principal point. It will be recognized that on image capture devices that provide the capability to move their lens and/or image sensor assemblies, the focal length may change from image to image. Based on the obtained parameter values, the device's intrinsic matrix may be found or generated (block 505). It will be understood that an image's intrinsic matrix links the pixel coordinates of an object point with the corresponding coordinates in the image capture device's reference frame. An image's perspective transform matrix may then be generated for a particular image using the image capture device's intrinsic matrix associated with that image (i.e., the intrinsic matrix generated using device parameter values that were in place when the image was captured) and the image's associated rotation matrix (block 510).

A perspective transform matrix for a given image may be derived as follows. First, it will be recognized by those of skill in the art that the 2D projection of real-space (which is 3D) onto a sensor array (which is 2D) may be given as—

$$\begin{pmatrix} x \\ y \\ z \end{pmatrix} = \Pi \begin{pmatrix} X \\ Y \\ Z \end{pmatrix},$$ EQ. 1 where $$\begin{pmatrix} X \\ Y \\ Z \end{pmatrix}$$

represents a point in real-space, $\Pi$ represents the image capture device's intrinsic matrix and $$\begin{pmatrix} x \\ y \\ z \end{pmatrix}$$

represents the 2D projection of the real-space point onto the sensor array's plane using homogeneous coordinates. In essence, EQ. 1 represents a 3D-to-2D transformation.

A novel use of this known relationship was to recognize that—

$$\begin{pmatrix} X \\ Y \\ Z \end{pmatrix} = \Pi^{-1} \begin{pmatrix} x \\ y \\ z \end{pmatrix},$$ EQ. 2 where $$\begin{pmatrix} x \\ y \\ z \end{pmatrix}$$

is as described above, $$\begin{pmatrix} X \\ Y \\ Z \end{pmatrix}$$

represents an estimate of where that point is in real-space, and $\Pi^{-1}$ represents the inverse of the image capture device's intrinsic matrix. Thus, EQ. 2 represents a 3D-to-2D transformation estimator.

Based on the discussion above regarding FIGS. 4A and 4B, it will be recognized that—

$$\begin{pmatrix} X_1 \\ Y_1 \\ Z_1 \end{pmatrix} = [R_{01}] \begin{pmatrix} X_0 \\ Y_0 \\ Z_0 \end{pmatrix},$$ EQ. 3 where $$\begin{pmatrix} X_0 \\ Y_0 \\ Z_0 \end{pmatrix}$$

represents the real-space location of a point at time $t_0$ (as reflected in the image captured at time $t_0$), $[R_{01}]$ represents the rotation matrix for image-1 from time $t_0$ (and image $I_0$) to time $t_1$, and $$\begin{pmatrix} X_1 \\ Y_1 \\ Z_1 \end{pmatrix}$$

represents the location of the same point after being rotated as characterized by $[R_{01}]$.

From EQ. 1 we may obtain—

$$\begin{pmatrix} x_1 \\ y_1 \\ z_1 \end{pmatrix} = \Pi_1 \begin{pmatrix} X_1 \\ Y_1 \\ Z_1 \end{pmatrix},$$ EQ. 4 where $\Pi_1$ represents the image capture device's intrinsic matrix at time $t_1$. Substituting EQ. 3 into EQ. 4 yields—

$$\begin{pmatrix} x_1 \\ y_1 \\ z_1 \end{pmatrix} = \Pi_1 [R_{01}] \begin{pmatrix} X_0 \\ Y_0 \\ Z_0 \end{pmatrix}.$$ EQ. 5

From EQ. 2, we have—

$$\begin{pmatrix} X_0 \\ Y_0 \\ Z_0 \end{pmatrix} = \Pi_0^{-1} \begin{pmatrix} x_0 \\ y_0 \\ z_0 \end{pmatrix}.$$ EQ. 6

Substituting EQ. 6 into EQ. 5 gives—

$$\begin{pmatrix} x_1 \\ y_1 \\ z_1 \end{pmatrix} = \Pi_1 [R_{01}] \Pi_0^{-1} \begin{pmatrix} x_0 \\ y_0 \\ z_0 \end{pmatrix},$$ EQ. 7 which may be rewritten as—

$$\begin{pmatrix} x_1 \\ y_1 \\ z_1 \end{pmatrix} = [P_{01}] \begin{pmatrix} x_0 \\ y_0 \\ z_0 \end{pmatrix},$$ EQ. 8 where $[P_{01}]$ represents the perspective transform matrix for image-1. Equations 7 and 8 describe how a point in an image captured at time $t_0$ moved to a new position at time $t_1$ due to rotation of the image capture device as represented by rotation matrix $[R_{01}]$. (It is also noted that EQS. 7 and 8 incorporate the image capture device's parameters (e.g., focal length) at times $t_0$ and $t_1$.) It is significant to note, perspective transform $[P_{01}]$ permits alignment of image-1 with image-0 without any image processing operations (i.e., analysis and/or registration). More particularly, perspective transform $[P_{01}]$ is based solely on the image capture device's parameter values (e.g., focal length) and rotational information (e.g., from a gyro) for each image. It will be recognized that this information is computationally inexpensive to obtain and process, allowing image stitching operations in accordance with this disclosure to be performed quickly and at low computational cost. This, in turn, may support high image capture rates. It is also noted that the methodologies disclosed herein may be used to complement traditional image registration methods.

Figure 6:
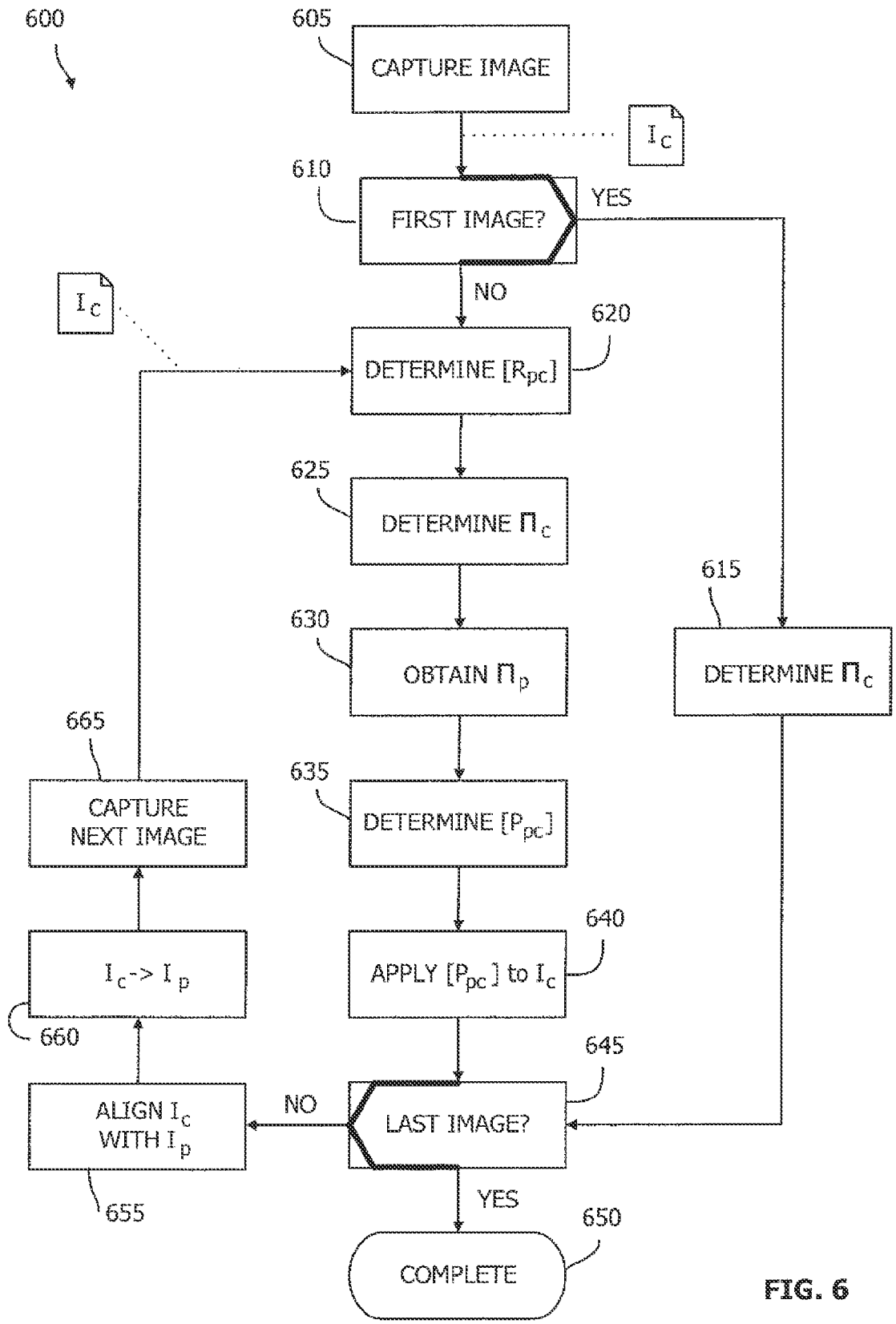
FIG. 6 shows, in flowchart form, an image stitching operation in accordance with another embodiment.

Referring to FIG. 6, the above operations may be reviewed in accordance with one embodiment as image stitching operation 600. As shown, operation 600 begins when a first image is captured (block 605). As noted, this image may be designated as the current image, $I_c$. If current image $I_c$ is the first image in an image sequence such as raw image sequence 105 (the "YES" prong of block 610), the image's associated intrinsic matrix $\Pi_c$ is determined, whereafter processing continues at block 645. If current image $I_c$ is not the first image in an image sequence (the "NO" prong of block 610), rotation matrix $[R_{pc}]$ between current image $I_c$ and prior image $I_p$ may be determined (block 620). Next, the image capture device's intrinsic matrix is obtained corresponding to current image $I_c$, $\Pi_c$ (block 625). The intrinsic matrix associated with prior image $I_p$ may then be obtained, $\Pi_p$ (block 630) and perspective transform matrix $[P_{pc}]$ determined (block 635) and applied to each pixel in current image $I_c$ (block 640). If current image $I_c$ is the last image in an image sequence (the "YES" prong of block 645), the last image (i.e., current image $I_c$) may be aligned with prior image $I_p$ in the image sequence whereafter stitching operation 600 is complete (block 650). If current image $I_c$ is not the last image in the image sequence (the "NO" prong of block 645), current image $I_c$ may be aligned with prior image $I_p$ in the image sequence (block 655), whereafter current image $I_c$ is made the prior image $I_p$ (block 660). A next image may be captured (block 665) which becomes the current image $I_c$ and processing continues at block 620.

In another embodiment, it has been determined that the alignment of a current image $I_c$ with a prior image $I_p$ can be accomplished without calculating the perspective transform matrix $[P_{pc}]$. From above, the perspective transform matrix $[P_{pc}]$ is defined in terms of the image capture device's intrinsic matrix $\Pi_c$ associated with image $I_c$, the rotation matrix between image $I_c$ and image $I_p$ $[R_{pc}]$, and the inverse of the image capture device's intrinsic matrix $\Pi_p$ associated with image $I_p$ (see EQ. 7). Eliminating the calculation of this matrix may result in a more accurate and computationally simple process.

Figure 7:
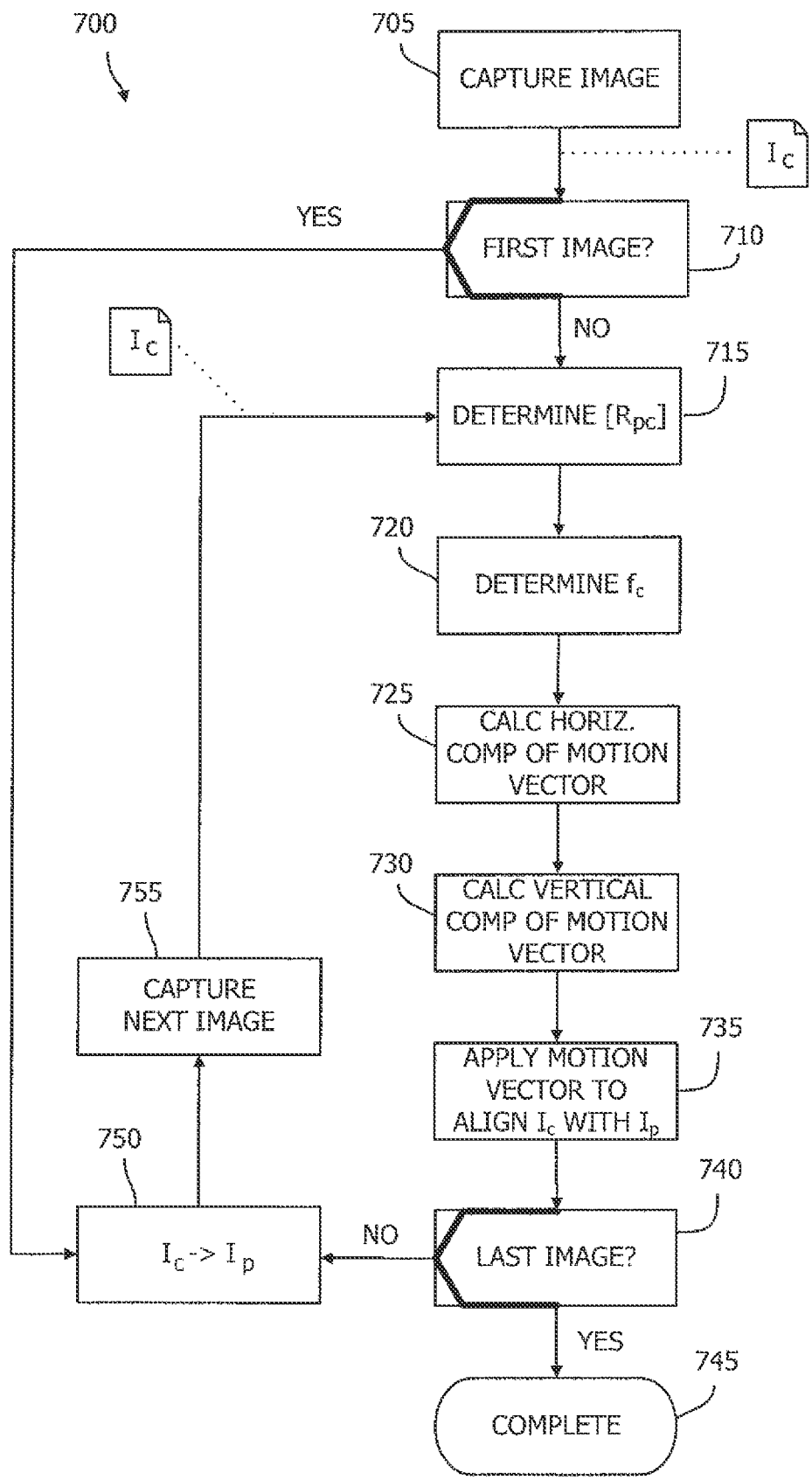
FIG. 7 shows, in flowchart form, an image stitching operation in accordance with another embodiment.

Referring to FIG. 7, in one embodiment, a process to align a series of images in raw image sequence 105 is illustrated as image stitching operation 700. In the same manner as operation 600, operation 700 begins when a first image is captured (block 705). As noted, this image may be designated as the current image, $I_c$. If current image $I_c$ is the first image in an image sequence such as raw image sequence 105 (the "YES" prong of block 710), the current image $I_c$ may be made the prior image $I_p$ (block 750), where after processing may continue at block 755. If current image $I_c$ is not the first image in an image sequence (the "NO" prong of block 710), rotation matrix $[R_{pc}]$ between current image $I_c$ and prior image $I_p$ may be determined (block 715). While it has been noted that rotation matrix $[R_{pc}]$ may be a 3×3 matrix, it should also be noted here that the 3×3 matrix may represent the rotated position of three unit vectors (û, v̂, ŵ) that form an orthonormal basis. More specifically, each element of rotation matrix $[R_{pc}]$ may represent one coordinate that describes the rotated position of one of the unit vectors in terms of a non-rotated, reference set of coordinate axes. Therefore, the rotation matrix may be expressed as:

$$[R_{pc}] = \begin{bmatrix} \hat{u}_x & \hat{v}_x & \hat{w}_x \\ \hat{u}_y & \hat{v}_y & \hat{w}_y \\ \hat{u}_z & \hat{v}_z & \hat{w}_z \end{bmatrix}, \quad \text{EQ. 9}$$

where each column of the rotation matrix may be described as a rotation vector and where each element of a rotation vector represents a coordinate of the rotation vector in terms of a three-dimensional reference coordinate system.

As will be understood by those of ordinary skill in the art, there are several ways to calculate rotation matrix $[R_{pc}]$ given the rotation position associated with two consecutive images in raw image sequence 105. Moreover, given this position information for two consecutive images, the elements of rotation matrix $[R_{pc}]$ (e.g., the scalar component coordinates for unit vectors û, v̂, and ŵ) may be calculated independently. By way of example, where the relative rotation between image $I_p$ and image $I_c$ is described by a quaternion (i.e., a normalized four element vector expressed as $\hat{q}=[q_1 \; q_2 \; q_3 \; q_4]^T$), in one embodiment the individual elements of rotation matrix $[R_{pc}]$ may be defined as:

$$[R_{pc}] = \begin{bmatrix} -1+2q_1^2+2q_4^2 & 2(q_1q_2-q_3q_4) & 2(q_1q_3+q_2q_4) \\ 2(q_1q_2+q_3q_4) & -1+2q_2^2+2q_4^2 & 2(q_2q_3-q_1q_4) \\ 2(q_1q_3-q_2q_4) & 2(q_1q_4+q_2q_3) & -1+2q_3^2+2q_4^2 \end{bmatrix}. \quad \text{EQ. 10}$$

Next, the focal length (f) (i.e., the distance between the sensor and lens center) associated with image $I_c$ may be determined (block 720). Because image parameter values (such as the focal length) may be part of the data associated with an image, determining the focal length associated with image $I_c$ may simply involve extracting this parameter from the image metadata. Given rotation matrix $[R_{pc}]$ and focal length f, the components of a motion vector that describes a change in position in two-dimensional space between a point in image $I_p$ and a corresponding point in image $I_c$ may be determined (blocks 725 and 730).

Figure 8:
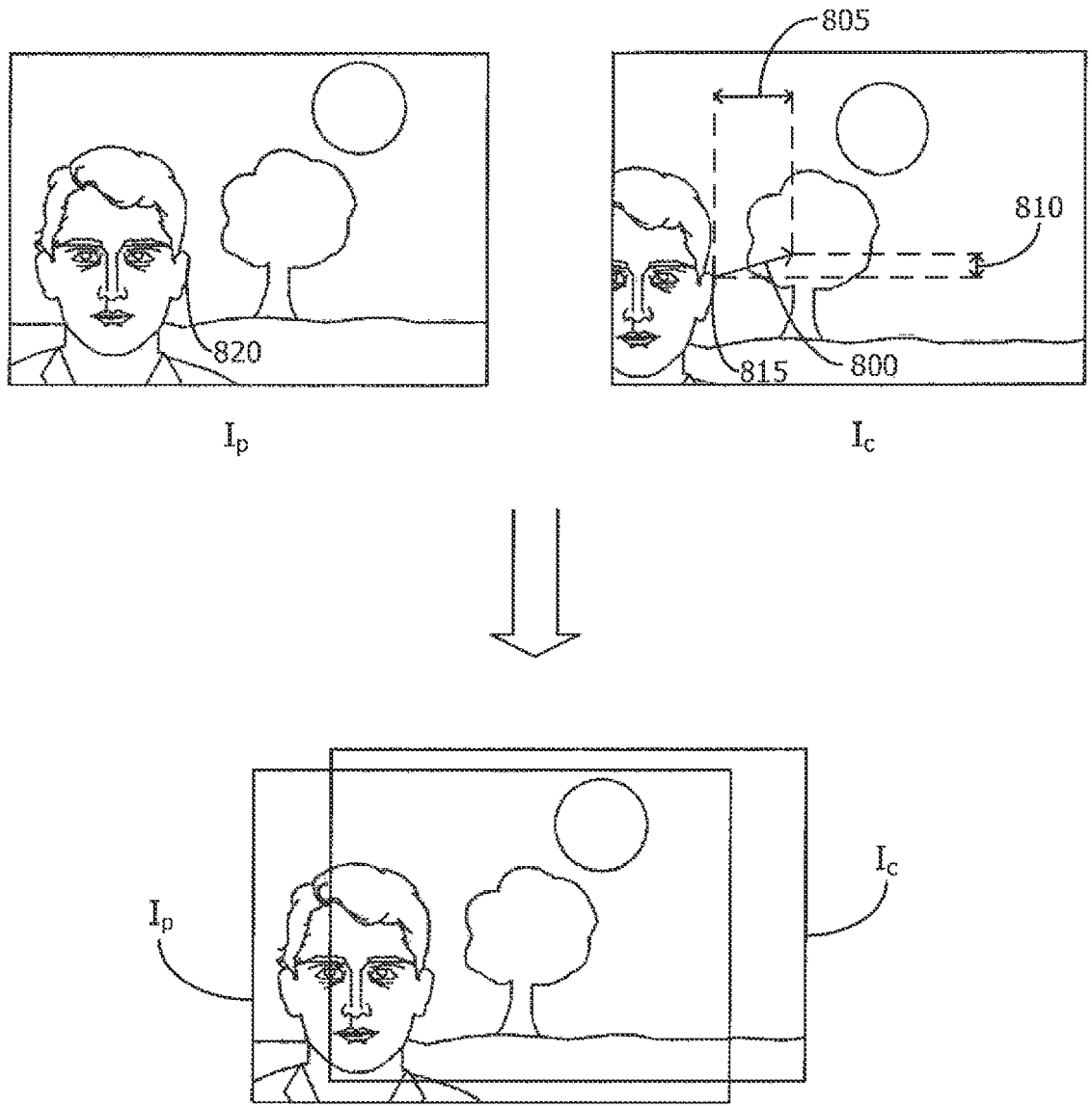
FIG. 8 shows the alignment of two consecutive images based on the calculation of a motion vector in accordance with the embodiment of FIG. 7.

Referring to FIG. 8, the motion between image $I_p$ and $I_c$ may be given in terms of horizontal and vertical motions, Δx and Δy respectively. As illustrated, horizontal component 805 of motion vector 800 (i.e., the scalar projection of motion vector 800 onto a horizontal axis) may be obtained from rotation matrix $[R_{pc}]$ and the focal length as:

$$\Delta x = f \times \left(\frac{\hat{w}_x}{\hat{w}_z}\right), \quad \text{EQ. 11}$$

where f represents the focal length of the image capture device during capture of $I_c$, and rotation vectors $\hat{w}_x$ and $\hat{w}_z$ are as discussed above with respect to EQ. 9. In similar fashion, vertical component 810 of motion vector 800 (i.e., the scalar projection of motion vector 800 onto a vertical axis orthogonal to the horizontal axis) may be determined as:

$$\Delta y = f \times \left(\frac{\hat{w}_y}{\hat{w}_z}\right), \quad \text{EQ. 12}$$

Motion vector 800 may then be applied to image $I_c$ so as to align it with prior image $I_p$ in the image sequence (block 735). Returning to FIG. 7, if current image $I_c$ is the last image in an image sequence (the "YES" prong of block 740), stitching operation 700 is complete (block 745). If current image $I_c$ is not the last image in the image sequence (the "NO" prong of block 740), current image $I_c$ may be made the prior image $I_p$ (block 750), and a next image may be captured (block 755) which becomes the current image $I_c$, and processing may continue at block 715. According to the embodiment illustrated in FIG. 7, successive images may be aligned utilizing a relatively simple calculation to obtain motion vector 800 without the need to calculate a perspective transform matrix $[P_{pc}]$. Although stitching process 700 indicates that rotation matrix $[R_{pc}]$ should be determined (block 715), it should be noted that the entire matrix need not be determined. Rather, because each element of rotation matrix $[R_{pc}]$ may be calculated independently as set forth above, and because motion vector 800 depends only on the focal length f and the rotation vector describing the position of unit vector $\hat{w}$, only the rotation vector describing the position of unit vector $\hat{w}$ (i.e., the third or right-hand column of rotation matrix $[R_{pc}]$) needs to be calculated in order to obtain motion vector 800.

Referring again to FIG. 8, motion vector 800 defines a change in position of a point from image $I_p$ to image $I_c$. In the illustrated embodiment, motion vector 800 represents a change in position from the frame of reference of image $I_p$. In one embodiment, a coordinate system may be defined such that the top left corner of image $I_p$ represents an origin (e.g., coordinate (0,0)) with a horizontal axis that increases from left to right and a vertical axis that increases from top to bottom. In such an embodiment, a positive horizontal component 805 of motion vector 800 may indicate that a particular pixel in image $I_c$ should be aligned with a pixel located further to the right in image $I_p$. Similarly, a positive vertical component 810 of motion vector 800 may indicate that a particular pixel in image $I_c$ should be aligned with a pixel located further down in image $I_p$. As illustrated, the computed motion vector 800 may be utilized to align point 815 in image $I_c$ with corresponding point 820 in image $I_p$.

Figure 9:
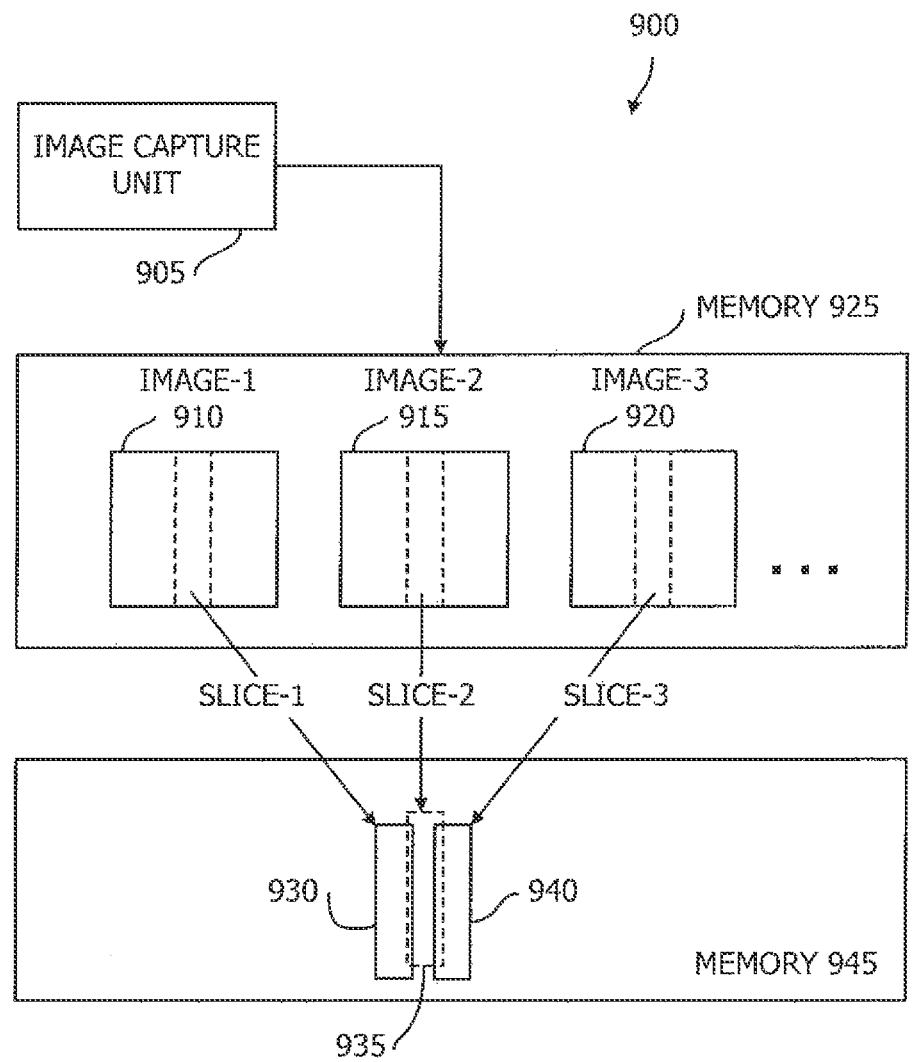
FIG. 9 shows, in block diagram form, an image capture device in accordance with one embodiment.

Image stitching operations have, so far, been described in terms of whole images. That is, a first image stitched to, or aligned with, another image. The disclosed techniques, however, are equally applicable to portions of images. Referring to FIG. 9, electronic device 900 may include image capture unit 905 which can deliver a sequence of images (e.g., images 910, 915 and 920) to first memory 925. A portion or slice of each image (e.g., slices 930, 935 and 940) may be extracted from each image, placed into second memory 945, and aligned or stitched as disclosed herein. It will be recognized that memory 925 and memory 940 may be different regions within a common physical memory or wholly separate memories. It should also be recognized that it is not necessary to stitch whole images or partial images only. A whole image may be aligned with a portion of a second image which, in turn, may be aligned with another slice or whole image.

Figure 10:
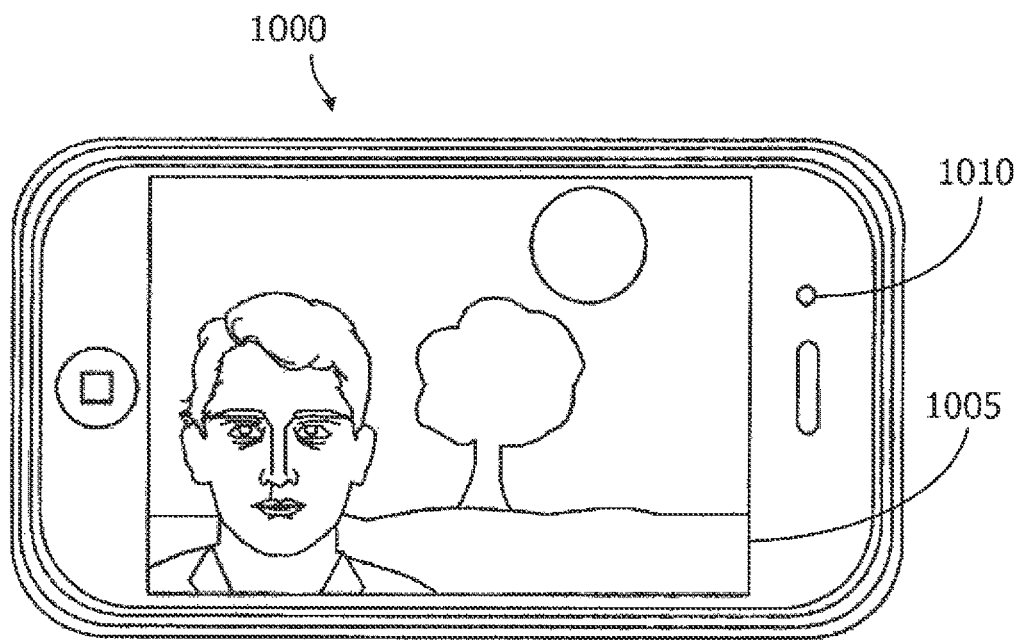
FIG. 10 shows an illustrative electronic device incorporating image stitching capability in accordance with this disclosure.

Referring to FIG. 10, one electronic device incorporating digital image stitching capability in accordance with this disclosure is shown. In this particular example, device 1000 represents a mobile telephone which provides preview or capture display 1005. Mobile telephone 1000 also includes microphone 1010 and one or more speakers (not shown). It will be recognized that the disclosed image stitching capability may be incorporated in many electronic devices. Examples include, but are not limited to, stand-alone digital electronic cameras, mobile music players, personal digital assistants (PDAs), and notebook, desktop and tablet computers.

Figure 11A:
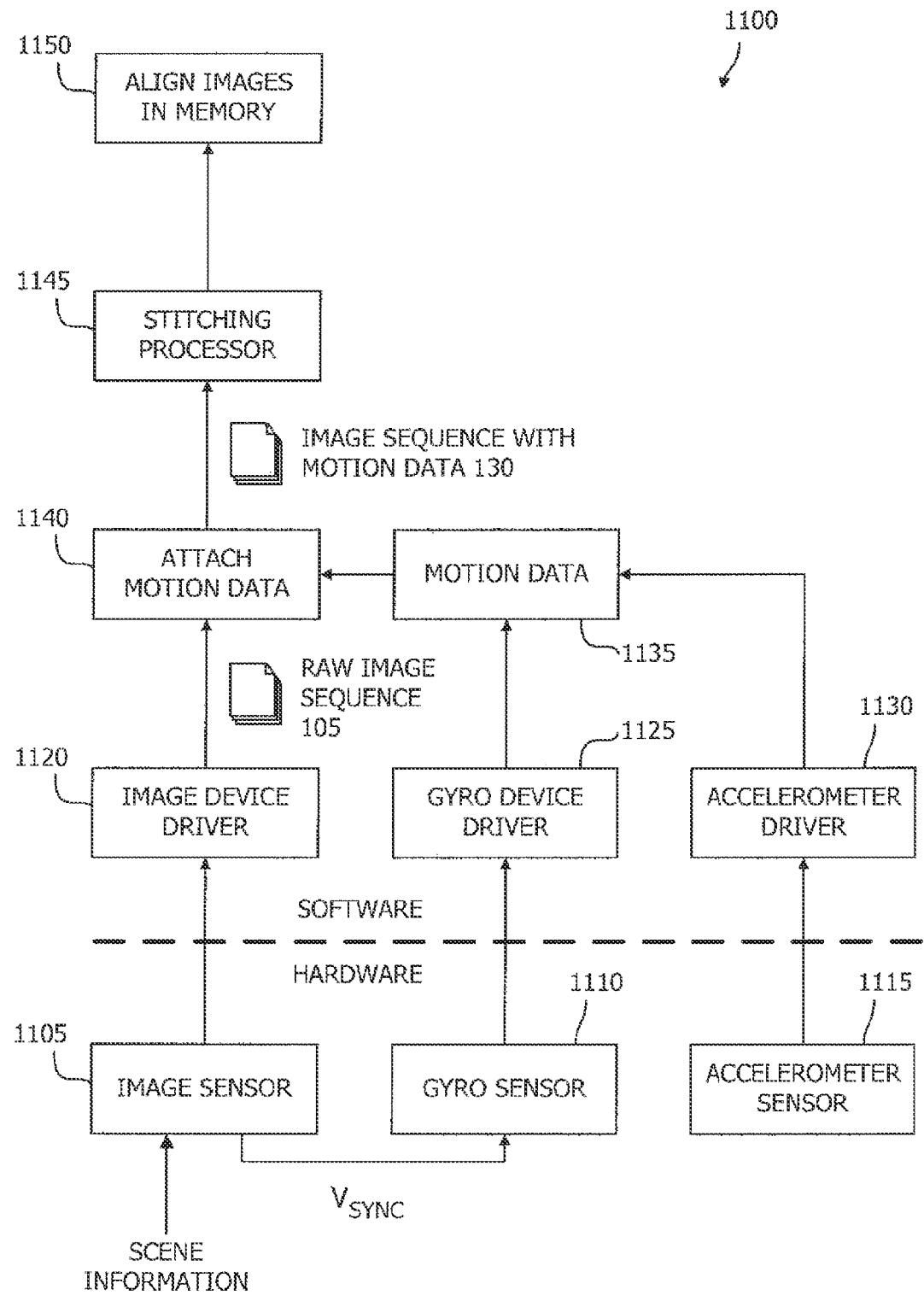
FIGS. 11A and 11B show, in a functional block diagram, two illustrative devices capable of performing image stitching in accordance with this disclosure.

Referring to FIG. 11A, a functional view of illustrative electronic device 1100 in accordance with this disclosure includes image sensor 1105, gyroscopic sensor 1110, and accelerometer 1115. Image sensor 1105 provides images to image device driver 1120, gyro sensor 1110 provides motion data (e.g., rate of movement) to gyro device driver 1125, and accelerometer 1115 provides its data to accelerometer driver 1130. In the example of FIG. 11A, images and motion data are correlated through the use of a $V_{sync}$ signal as discussed above with respect to FIG. 2A. Gyro and accelerometer data may be collected to generate motion data 1135 which may then be attached 1140 to individual images within raw image sequence 105. Once motion data has been attached, augmented image sequence 130 may be sent to stitching processor 1145 which transforms each image in accordance with either its particular perspective transform matrix or a calculated motion vector so that it may be aligned with prior images in memory 1150.

Figure 11B:
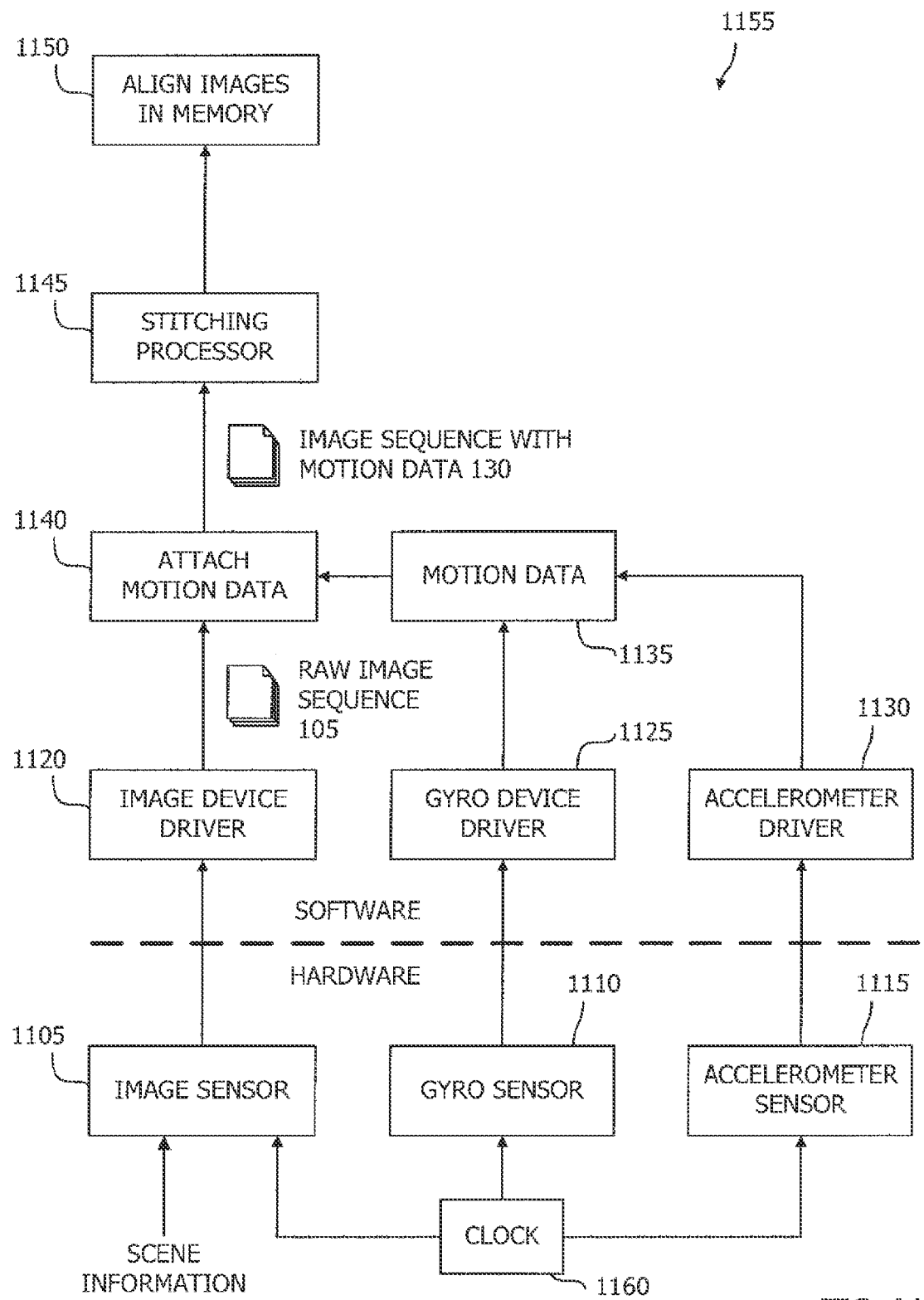

Referring to FIG. 11B, another illustrative image capture device 1155 is shown. In this embodiment, however, common clock 1160 drives image 1105, gyro 1110 and accelerometer 1115 sensors. As noted above with respect to FIG. 2B, use of common clock 1160 permits synchronous capture of image and motion data.

Figure 12:
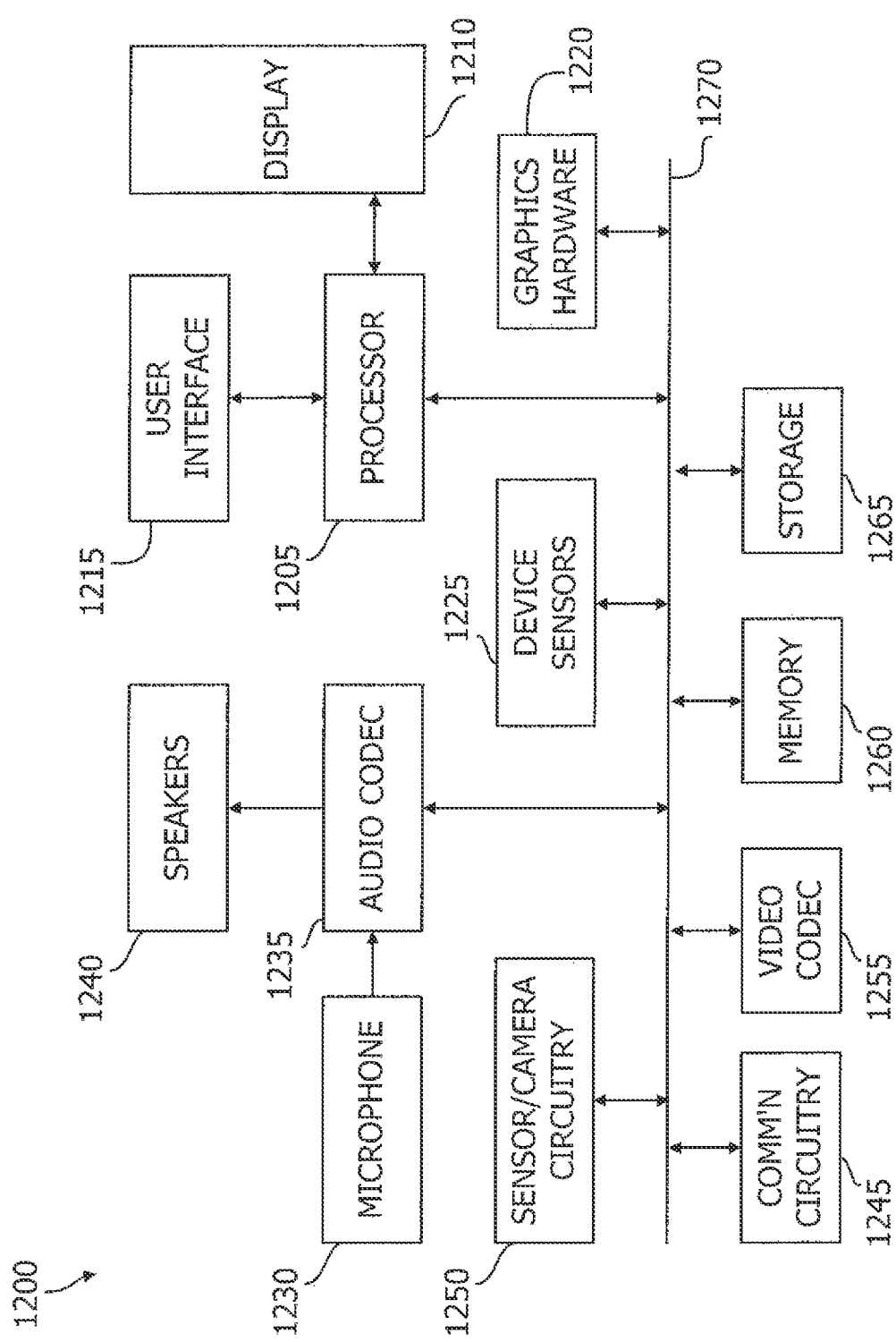
FIG. 12 shows, in block diagram form, an electronic device in accordance with one embodiment.

Referring to FIG. 12, a simplified functional block diagram of representative electronic device 1200 incorporating digital image stitching capability is shown according to one embodiment. Electronic device 1200 may include processor 1205, display 1210, user interface 1215, graphics hardware 1220, device sensors 1225 (e.g., proximity sensor/ambient light sensor, accelerometer and/or gyroscope), microphone 1230, audio codec(s) 1235, speaker(s) 1240, communications circuitry 1245, digital image capture unit 1250, video codec(s) 1255, memory 1260, storage 1265, and communications bus 1270. Electronic device 1200 may be, for example, a personal digital assistant (PDA), personal music player, mobile telephone, notebook, laptop, tablet, desktop, or server computer.

Processor 1205 may execute instructions necessary to carry out or control the operation of many functions performed by device 1200. Processor 1205 may, for instance, drive display 1210 and receive user input from user interface 1215. User interface 1215 may allow a user to interact with device 1200. For example, user interface 1215 can take a variety of forms, such as a button, keypad, dial, a click wheel, keyboard, display screen and/or a touch screen. Processor 1205 may also, for example, be a system-on-chip such as those found in mobile devices and include a dedicated graphics processing unit (GPU). Processor 1205 may be based on reduced instruction-set computer (RISC) or complex instruction-set computer (CISC) architectures or any other suitable architecture and may include one or more processing cores. Graphics hardware 1220 may be special purpose computational hardware for processing graphics and/or assisting processor 1205 to process graphics information. In one embodiment, graphics hardware 1220 may include a programmable graphics processing unit (GPU).

Sensor and camera circuitry 1250 may capture still and video images that may be processed, at least in part, by video codec(s) 1255 and/or processor 1205 and/or graphics hardware 1220, and/or a dedicated image processing unit incorporated within circuitry 1250. Images so captured may be stored in memory 1260 and/or storage 1265. Memory 1260 may include one or more different types of media used by processor 1205 and graphics hardware 1220 to perform device functions. For example, memory 1260 may include memory cache, read-only memory (ROM), and/or random access memory (RAM). Storage 1265 may store media (e.g., audio, image and video files), computer program instructions or software, preference information, device profile information, and any other suitable data. Storage 1265 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1260 and storage 1265 may be used to tangibly retain computer program instructions or code organized into one or more modules and written in any desired computer programming language. When executed by, for example, processor 1205 such computer program code may implement one or more of the methods described herein.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
   obtain a first image from an image capture device at a first time, the first image having a first motion data from a motion sensor of the image capture device;
   obtain a second image from the image capture device at a second time, the second image having a second motion data from the motion sensor and a focal length;
   determine a rotation metric indicative of the rotation of the image capture device between the first time and the second time based on the first motion data and the second motion data;
   determine a translation measure for the second image, relative to the first image, based on the rotation metric and the focal length; and
   align at least a portion of the second image with at least a portion of the first image in a memory based on the translation measure without performing an image registration that uses image processing operations on the first image and the second image.

2. The non-transitory program storage device of claim 1, wherein the instructions to cause the processor to obtain the first image further comprise instructions to cause the processor to attach the first motion data to the first image.

3. The non-transitory program storage device of claim 1, wherein the motion sensor comprises a gyroscopic sensor.

4. The non-transitory program storage device of claim 2, wherein the instructions to cause the processor to attach the first motion data to the first image further comprise instructions to cause the processor to incorporate the first motion data in a file with the first image.

5. The non-transitory program storage device of claim 1, wherein the first motion data and the second motion data comprise first and second quaternions.

6. The non-transitory program storage device of claim 5, wherein the instructions to cause the processor to determine the rotation metric, comprise instructions to cause the processor to determine a three-by-three rotation matrix as the rotation metric based on combinations of the first and second quaternions.

7. The non-transitory program storage device of claim 5, wherein the instructions to cause the processor to determine the rotation metric, comprise instructions to cause the processor to determine a partial rotation matrix as the rotation metric based on the first and the second quaternions.

8. The non-transitory program storage device of claim 1, wherein the translation measure is a single rotation vector that represents a change in position in a two-dimensional space between the first image and the second image.

9. The non-transitory program storage device of claim 1, wherein the instructions to cause the processor to determine the translation measure further comprise instructions to cause the processor to:
   determine a horizontal translation measure for a first axis based on the rotation metric and the focal length; and
   determine a vertical translation measure for a second axis based on the rotation metric and the focal length, wherein determining the horizontal translation and the vertical translation prevents determining a perspective transform matrix to determine the translation measure.

10. The non-transitory program storage device of claim 9, wherein the instructions to cause the processor to align at least a portion of the second image with at least a portion of the first image further comprise instructions to cause the processor to:
   move the second image along the first axis, relative to the first image, by an amount indicated by the horizontal translation measure; and
   move the second image along the second axis, relative to the first image, by an amount indicated by the vertical translation measure.

11. A non-transitory program storage device, readable by a processor and comprising instructions stored thereon to cause the processor to:
   obtain a first image from an image capture device at a first time, the first image having first motion data from a motion sensor of the image capture device;
   obtain a second image from the image capture device at a second time, the second image having a focal length and a second motion data from the motion sensor of the image capture device;
   determine a rotation metric indicative of the rotation of the image capture device between the first time and the second time based on the first motion data and the second motion data;
   determine a first translation measure for a first axis based on the rotation metric and the focal length;

determine a second translation measure for a second axis based on the rotation metric and the focal length; and
align at least a portion of the second image with at least a portion of the first image in a memory based on the first translation measure and the second translation measure without performing an image registration that uses image processing operations on the first image and the second image.

12. The non-transitory program storage device of claim 11, wherein the instructions to cause the processor to obtain the second image, further comprise instructions to cause the processor to associate the second motion data with the second image.

13. The non-transitory program storage device of claim 11, wherein the first motion data and the second motion data comprise first and second quaternions.

14. The non-transitory program storage device of claim 11, wherein the instructions to cause the processor to determine the rotation metric, comprise instructions to cause the processor to determine a partial rotation matrix as the rotation metric, and wherein determining the first translation and the second translation avoids determining a perspective transform matrix for aligning the at least a portion of the second image with the at least a portion of the first image.

15. An image alignment method, comprising:
obtaining a first image from an image capture device at a first time, the first image having first motion data from a motion sensor of the image capture device;
obtaining a second image from the image capture device at a second time, the second image having a focal length and a second motion data from the motion sensor of the image capture device;
determining a rotation metric indicative of the rotation of the image capture device between the first time and the second time based on the first motion data and the second motion data;
determining a first translation measure for a first axis based on the rotation metric and the focal length;
determining a second translation measure for a second axis based on the rotation metric and the focal length; and
aligning at least a portion of the second image with at least a portion of the first image in a memory based on the first translation measure and the second translation measure without performing an image registration that uses image processing operations on the first image and the second image.

16. The method of claim 15, wherein the act of obtaining the second image further comprises associating the second motion data with the second image.

17. The method of claim 15, wherein the first motion data and the second motion data comprise first and second quaternions.

18. The method of claim 15, wherein the act of determining a rotation metric comprises determining a partial rotation matrix as the rotation metric, and wherein determining the first translation and the second translation avoids determining a perspective transform matrix for aligning the at least a portion of the second image with the at least a portion of the first image.

19. An image capture device, comprising:
an image sensor;
a motion sensor;
a memory communicatively coupled to the image sensor; and
a processor communicatively coupled to the motion sensor and configured to execute instructions stored in the memory to—
obtain a first image from the image sensor at a first time, the first image having first motion data from the motion sensor,
obtain a second image from the image sensor at a second time, the second image having a second motion data from the motion sensor and a focal length,
determine a rotation metric indicative of the rotation of the image capture device between the first time and the second time based-on the first motion data and the second motion data,
determine a translation measure for the second image, relative to the first image, based on the rotation metric and the focal length, and
align at least a portion of the second image with at least a portion of the first image in the memory based on the translation measure without performing an image registration that uses image processing operations on the first image and the second image.

20. The image capture device of claim 19, wherein the motion sensor comprises a gyroscopic sensor.

21. The image capture device of claim 19, wherein the first motion data and the second motion data comprise first and second quaternions.

22. The image capture device of claim 21, wherein the instructions to cause the processor to determine a rotation metric, comprise instructions to cause the processor to determine a partial rotation matrix as the rotation metric based on the first and the second quaternions.

23. The image capture device of claim 19, wherein the instructions to cause the processor to determine the translation measure further comprise instructions to cause the processor to:
determine a motion vector that comprises a first translation measure and a second translation measure, wherein the motion vector indicates a change in position in a two-dimensional space between the first image and the second image;
determine the first translation measure for a first axis based on the rotation metric and the focal length; and
determine the second translation measure for a second axis based on the rotation metric and the focal length.

24. The image capture device of claim 23, wherein the instructions to cause the processor to align the second image with the first image further comprise instructions to cause the processor to:
move the second image along the first axis, relative to the first image, by an amount indicated by the first translation measure; and
move the second image along the second axis, relative to the first image, by an amount indicated by the second translation measure.

25. The non-transitory program storage device of claim 1, wherein the instructions to cause the processor to determine the translation measure, comprise instructions to cause the processor to determine the translation measure based on an intrinsic matrix of the image capture device associated with the second image and an inverse intrinsic matrix of the image capture device associated with the first image.

26. The non-transitory program storage device of claim 11, wherein the first translation measure and the second translation measure are part of a motion vector that represents a change in position in a two-dimensional space between the first image and the second image.

27. The method of claim 15, wherein the first translation measure and the second translation measure form a motion vector that represents a change in position in a two-dimensional space between the first image and the second image.

28. The image capture device of claim 19, wherein the instructions to cause the processor to determine the translation measure, comprise instructions to cause the processor to determine the translation measure based on an intrinsic matrix of the image capture device associated with the second image and an inverse intrinsic matrix of the image capture device associated with the first image.

* * * * *